July 31, 1923.

K. I. NUTTER 1,463,588

DEMOUNTABLE WHEEL RIM

Filed June 4, 1921

2 Sheets-Sheet 1

INVENTOR:
Karl I. Nutter,
BY
E. T. Silvius,
ATTORNEY.

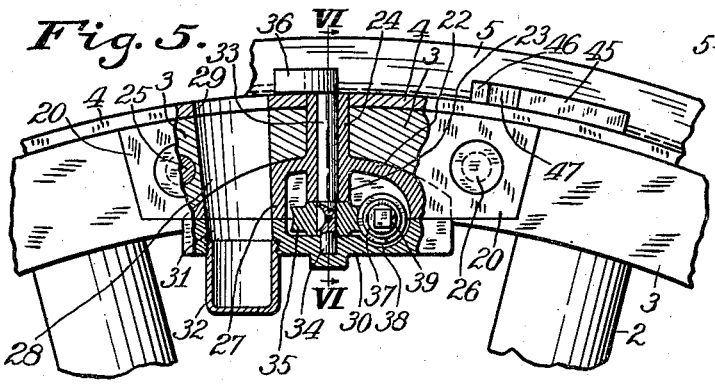
July 31, 1923.
K. I. NUTTER
DEMOUNTABLE WHEEL RIM
Filed June 4, 1921
1,463,588
2 Sheets-Sheet 2
INVENTOR:
Karl I. Nutter,
BY
E. D. Silvius,
ATTORNEY.

Patented July 31, 1923.

1,463,588

UNITED STATES PATENT OFFICE.

KARL I. NUTTER, OF MARTINSVILLE, INDIANA.

DEMOUNTABLE WHEEL RIM.

Application filed June 4, 1921. Serial No. 474,913.

*To all whom it may concern:*

Be it known that I, KARL I. NUTTER, a citizen of the United States, residing at Martinsville, in the county of Morgan, and State of Indiana, have invented a new and useful Demountable Wheel Rim, of which the following is a specification, reference being had to the accompanying drawings, and to the letters and figures of reference marked thereon.

This invention relates to the type of wheel that is commonly used on motor vehicles and especially on automobiles, the invention having reference more particularly to a wheel rim that is designed to be quickly removed from or applied to a wheel.

An object of the invention is to provide a demountable wheel rim which shall be so constructed as to be quickly and reliably secured to a wheel, and without the necessity of manipulating many or troublesome devices.

Another object is to provide an improved demountable wheel rim of such construction as to insure positive locking connection between the wheel and the rim, and which shall be proof against accidental unlocking.

A further object is to provide improved means enabling an automobile operator to carry a spare tire inflated and to quickly apply it to a wheel on removal of a damaged tire.

A still further object is to provide a demountable wheel rim which shall be so constructed as to not be liable to adhere and cause difficulty in removing the rim from a wheel, and which shall be so constructed that it shall be automatically released from the wheel while the rim is being unlocked from the wheel.

With the above mentioned and other objects in view, the invention consists in a wheel provided with novel locking apparatus and an improved rim having improved elements whereby to lock the rim to the wheel; and, the invention consists also further in the parts and combinations and arrangements of parts as hereinafter particularly described and further defined in the appended claims.

Figure 1:
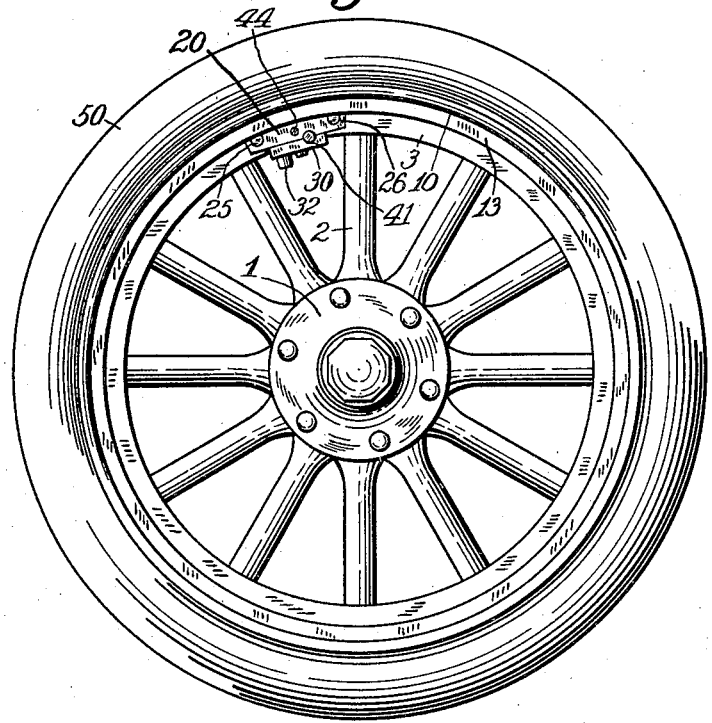
Figure 2:
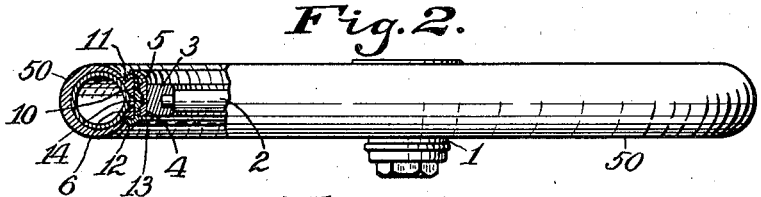
Figure 3:
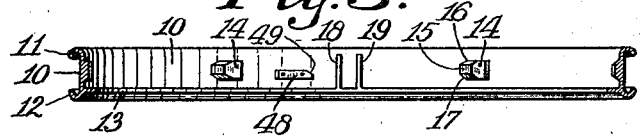
Figure 4:

Referring to the drawings, Figure 1 is a front view of an automobile wheel provided with the improvement as preferably constructed; Fig. 2 is a top view of Fig. 1, but broken away in part to show cross-sectional structure; Fig. 3 is a central section of the improved rim; Fig. 4 is a peripheral view of the wheel, or more particularly a felly band comprised in the invention; Fig. 5 is a fragmentary front view of the improved wheel and locking structure, partially in section; Fig. 6 is a transverse section approximately on the line VI—VI in Fig. 5; Figs. 7 and 8 are plan views of wedging devices for assisting in securing the rim to the wheel, the device in Fig. 7 being inverted relatively to its operative relation to the device shown in Fig. 8; Fig. 9 is a fragmentary peripheral view of the wheel partially broken away; Fig. 10 is a fragmentary front view, partially in section, showing the improved rim connected to the improved wheel; Fig. 11 is a fragmentary detail showing wedge devices designed for assisting in releasing the rim from the wheel; and, Fig. 12 is a fragmentary section illustrating locking devices whereby to secure the rim to the wheel.

Similar reference characters in the different figures of the drawings indicate corresponding or like elements or features of construction herein referred to in detail.

In the drawings the numeral 1 indicates the hub, 2 the spokes and 3 an improved felly of a wooden spoke wheel suitable for motor vehicles, and it should be understood that the invention is applicable to the peripheral portion of a disk wheel and to a wire wheel. The felly 3 is represented as being made of solid wood, but in some cases the felly may be made of metal and hollow.

The felly when made of wood has a band 4 thereon which preferably has a flange 5 on its edge that is adjacent to the inner side of the wheel. The periphery of the band has a suitable number of bearing blocks or projections 6 thereon, each of which has an inclined portion or wedge face 7 in one end portion thereof, the groove in which the inclined portion is formed having inclined guide sides 8 and 9. An improved rim 10 is provided which has suitable flanges or beads 11 and 12 for retaining a tire on the rim, and preferably the edge of the rim that is adjacent to the front of the felly has an inner facing-ring 13 thereon that extends opposite to the front of the felly. The inner side of the rim has a suitable number of wedge blocks 14 thereon, each having an inclined or wedge face 15 extending from one end thereof to engage the wedge face 7, and beveled sides 16 and 17 to cooperate with the guide sides 8 and 9 respectively for bringing the rim to proper position on the felly. The inner side of the rim has also two transversely extending abutment bars 18 and 19 thereon.

A gear case is provided which practically comprises a segment of the felly and preferably has a front plate 20 and a rear plate 21 which are set in flush with the faces of the felly, and a base member 22 between the plates, the felly being recessed to receive the base member. The base member has a journal bearing 23 extending towards the wheel hub and a bearing member 24 extending through a suitable opening in the band 4 or to the inner side of the band if preferred. The plates 20 and 21 are directly secured to the felly by means of rivets 25 and 26 or suitable devices. The base member 22 has a tube 27 therein to receive a tire inflation tube or nipple, being in alinement with a slot 28 in the felly and a slot 29 in the band 4 designed to receive the inflation tube. The gear case has a cap 30 thereon that is in contact with the plates 20 and 21. The plates 20 and 21 are fitted to the inner side of the band 4, being curved to conform thereto. The cap 30 has an aperture 31 in alinement with the tube 27, and the aperture preferably is closed by means of a cap 32. A shaft 33 is rotatively arranged and supported in the bearings 23 and 24 and it has a relatively small portion 34 that is journaled in the cap 30 and has a worm gear 35 secured thereto so as to be within the gear case, and an eccentric 36 is fixed, preferably integrally, on the outer end of the shaft 33 so as to operate at the outer side of the band 4. An operating shaft 37 is journaled partially in the side plates 20 and 21 and partially in the cap 30 and it has a worm 38 fixed thereto which engages the gear 35. The shaft 37 has a squared end portion 39 to be engaged by a crank or a socket wrench and is accessible through a suitable opening in the gear case and preferably is locked against accidental rotation by means of a collar 40 extending about the squared portion, and a cap 41 screwed into the opening and into engagement with the collar, the cap covering the end of the shaft. Preferably the cap 30 is secured in place by means of bolts 42 connected thereto and extending through the felly and the band 4, and nuts 43 on the bolts engaging the outer side of the band. Preferably the plate 20 has an oil hole therein closed by a plug 44. When the rim is arranged on the felly or its band 4 the eccentric 36 is arranged to operate between and in contact with the abutment bars 18 and 19.

Preferably the band 4 or the periphery of the felly has a suitable number of guide bars 45 fixed thereon, each having a projection 46 extending towards the front edge of the band, and a wedge face 47 presented forwardly, also the inner side of the rim 10 has a suitable number of guide bars 48 fixed thereto, each of which has a wedge face 49 presented rearwardly, so as to engage the wedge face 47 for the purpose of forcing the rim forwardly when moved circumferentially.

A pneumatic tire 50 is suitably secured to the rim 10 and, as will be understood, has an inflation tube or nipple 51 that is inserted through the slot 29 and into the slot 28, so as to be accessible when the cap 32 is removed.

In practical use a tire is placed on the rim 10 and afterwards inflated, and when the tire is needed on a wheel the rim is easily placed on the wheel after first inserting the inflation tube 51 in the opening designed for it in the wheel felly, the abutment bars 18 and 19 being brought so as to engage the eccentric 36. The rim being guided by the guide bars 45 and 48 and also by the flange 5 so that when the rim is turned circumferentially the wedges 15 will be guided to the wedges 7, the side guides 8 and 9 more accurately bringing the rim to proper position on the wheel. The turning of the rim is easily accomplished by rotating the worm 38 by means of a suitable wrench applied to the squared portion 39 whereby the rim is forcibly moved until securely tightened by the wedging devices. In case the rim is not truly circular it will be forced to become true on the bearing blocks 6. By reverse operations the rim may be easily and quickly removed from the wheel, the wedges 47 and 49 cooperating to start the rim towards the forward portion of the wheel without requiring the use of a hammer to drive off the rim.

Having thus described the invention, what is claimed as new is:—

1. A vehicle wheel including a wheel felly having a recess in its inner portion, a gear case having a base member arranged in the recess and two side plates secured to opposite sides respectively of the felly, the case having also a cap secured to said plates, the base member having a journal bearing that extends to the periphery of the felly, a shaft rotatably supported by the journal bearing, a toothed operating wheel arranged in the gear case and fixed to the shaft adjacent to the inner end thereof, and a power device fixed to the outer end of the shaft.

2. A vehicle wheel including a wheel felly, a chambered gear case secured in the felly and provided with a journal bearing that extends outward beyond the case and through the felly to the periphery thereof, a shaft rotatably supported by the journal bearing, a gear wheel arranged in the gear case and secured to the shaft, a power device fixed to the outer end of the shaft, and a worm arranged in the gear case in connection with the gear wheel and having journals rotatably supported by the case, one of the journals having a squared portion within a wall portion of the gear case.

3. A vehicle wheel including a wheel felly, a chambered gear case secured in the felly and provided with a journal bearing extending outward through the felly to the periphery thereof, a shaft rotatably supported by the journal bearing and extending through the bearing and into the chamber in the gear case, a gear wheel arranged in the chamber and secured to the shaft, a power device fixed to the shaft adjacent to the outer end of the journal bearing, a worm arranged in the chamber in connection with the gear wheel and having journals rotatably supported by the gear case, one of the journals having a squared portion, and a cap co-operating with the wall of the gear case and also with the journal adjacent to the squared portion to lock the worm against rotation.

4. A vehicle wheel including a felly having an aperture therein, a chambered gear case secured in the felly and having a tube in alinement with the aperture and having also a journal bearing extending outward through the felly and beyond the periphery thereof, a band embracing the felly and having an aperture in alinement with the aperture in the felly and having also an opening receiving the end portion of the journal bearing, a shaft rotatively supported in the journal bearing, a power-transmitting device fixed on the outer end of the shaft, a gear wheel arranged in the chamber in the gear case and fixed on the inner end of the shaft, a worm arranged also in the chamber and in connection with the gear wheel and having journals rotatably supported by the gear case, one of the journals having a squared portion arranged in a portion of the wall of the gear case, a cap connected to the gear case and covering said tube, and a cap secured to the gear case and covering said squared journal portion.

5. In a demountable wheel rim, the combination of a gear case comprising two side plates and a base member between the plates fixed thereto, the case comprising also a cap plate secured to said side plates, said member having a journal bearing extending from the inner side thereof towards the cap plate and a journal bearing extending from the outer side of the member; a shaft rotatively supported in said bearings and having a portion journaled in said cap plate, a gear wheel fixed to the shaft adjacent to the inner side of the cap plate, an eccentric fixed to the shaft at the end of the outer one of the journal bearings, and a worm arranged between said side plates in connection with the gear wheel and having journals rotatably supported by said plates and partially by said cap plate, one of said journals having a squared portion.

6. In a demountable wheel rim, the combination of a gear case comprising two side plates and a base member between the plates fixed thereto, said member having a tube therein and also journal bearings extending from opposite sides respectively thereof, the gear case comprising also a cap plate secured to said side plates and having an aperture therein alining with said tube; a cap removably secured in said aperture, a shaft rotatively supported in said bearings and having a portion journaled in said cap plate, an eccentric fixed to the shaft at the outer end thereof, a gear wheel fixed to the shaft adjacent to the inner end thereof, a worm arranged between said side plates in connection with the gear wheel and having journals rotatably supported by the plates and said cap plate, one of said journals having a squared portion arranged partially in said cap plate and partially in one of said side plates, a collar connected to said squared journal portion and seated on the end of the adjacent journal, and a cap secured to said cap plate and the adjacent one of said side plates and engaging said collar to lock said worm against rotation.

7. In a demountable wheel rim, the combination with a wheel felly, of a band embracing the felly and having bearing blocks fixed thereon, each block having a groove extending from one end of the front thereof, the bottom and the sides of the groove being inclined, said band having also guide bars extending circumferentially thereon, each guide bar having a lateral projection provided with a wedge face on its forward side, and a rim provided on its inner side with wedge blocks having each an inclined face extending from one end thereof to engage the inclined bottoms of said grooves, each wedge block having also beveled sides adjacent to the inclined face to engage the inclined sides of said grooves, said rim being provided also with fixed guide bars having each a wedge face on its rearward side to engage the wedge face on said first-described guide bars.

In testimony whereof, I affix my signature in presence of two witnesses.

KARL I. NUTTER.

Witnesses:
E. T. SILVIUS,
ROBERT LIEBRICK.